(12) United States Patent
Crice

(10) Patent No.: US 8,238,198 B2
(45) Date of Patent: Aug. 7, 2012

(54) SYSTEMS AND METHODS FOR SEISMIC DATA ACQUISITION

(75) Inventor: Douglas B Crice, Grass Valley, CA (US)

(73) Assignee: Wireless Seismic, Inc., Louisville, CO (US)

( * ) Notice: Subject to any disclaimer, the term of this patent is extended or adjusted under 35 U.S.C. 154(b) by 0 days.

(21) Appl. No.: 12/982,290

(22) Filed: Dec. 30, 2010

(65) Prior Publication Data

US 2012/0170408 A1    Jul. 5, 2012

(51) Int. Cl.
*G01V 1/00* (2006.01)
(52) U.S. Cl. ............................................ 367/77; 367/78
(58) Field of Classification Search ................. 367/76–80
See application file for complete search history.

(56) References Cited

U.S. PATENT DOCUMENTS

| 7,573,782 | B2 * | 8/2009 | Barakat ............................ 367/77 |
| 2005/0003827 | A1 * | 1/2005 | Whelan .......................... 455/454 |
| 2008/0049554 | A1 * | 2/2008 | Crice et al. ..................... 367/79 |

OTHER PUBLICATIONS

Schwartz, "Frequency Hopping Spread Spectrum (FHSS) vs. Direct Sequence Spread Spectrum (DSSS) in Broadband Wireless Access (BWA) and Wireless LAN (WLAN)", May 20, 2009.*
Banner, "Frequency Hop Spread Spectrum vs. Direct Sequence Spread Spectrum", 2007.*
Schwartz, "Frequency Hopping Spread Spectrum (FHSS) vs. Direct Sequence Spread Spectrum (DSSS) in Broadband Wireless Acess (BWA) and Wireless LAN (WLAN)", May 20, 2009.*

* cited by examiner

*Primary Examiner* — Jack W Keith
*Assistant Examiner* — Krystine Breier
(74) *Attorney, Agent, or Firm* — Marsh Fischmann & Breyfogle LLP

(57) ABSTRACT

Systems and methods for seismic data acquisition utilizing wireless modules to perform real time data read out. The wireless modules may be assigned a shared multiplexing sequence through which each module advances in successive transmission periods. Wireless modules belonging to a shared collision domain may be operated out of phase from one another with respect to the shared multiplexing signature sequence. As such, a dynamic multiplexing regime may be implemented. The shared multiplexing signature sequence may include, among others, a plurality of different frequencies, a plurality of different codes, or a plurality of different discrete time periods.

18 Claims, 12 Drawing Sheets

SYSTEMS AND METHODS FOR SEISMIC DATA ACQUISITION

FIELD

The present disclosure relates to systems and methods for preventing collisions of data contained in data transmissions that are wirelessly transmitted from a wireless acquisition unit in a seismic array. Specifically, the present disclosure relates to systems and methods wherein a shared multiplexing sequence is applied to one or more wireless units in a seismic array such that the wireless units employ the shared multiplexing sequence and operate out of phase from one another with respect to the shared multiplexing sequence.

BACKGROUND

Seismic surveys are often used by natural resource exploration companies and other entities to create images of subsurface geologic structure. These images are used to determine the optimum places to drill for oil and gas and to plan and monitor enhanced resource recovery programs among other applications. Seismic surveys may also be used in a variety of contexts outside of oil exploration such as, for example, locating subterranean water and planning road construction.

A seismic survey is normally conducted by placing an array of vibration sensors (accelerometers or velocity sensors called "geophones") on the ground, typically in a line or in a grid of rectangular or other geometry. Vibrations are created either by explosives or a mechanical device such as a vibrating energy source or a weight drop. Multiple energy sources may be used for some surveys. The vibrations from the energy source propagate through the earth, taking various paths, refracting and reflecting from discontinuities in the subsurface, and are detected by the array of vibration sensors. Signals from the sensors are amplified and digitized, either by separate electronics or internally in the case of "digital" sensors. The survey might also be performed passively by recording natural vibrations in the earth.

The digital data from a multiplicity of sensors is eventually recorded on storage media, for example magnetic tape, or magnetic or optical disks, or other memory device, along with related information pertaining to the survey and the energy source. The energy source and/or the active sensors are relocated and the process continued until a multiplicity of seismic records is obtained to comprise a seismic survey. Data from the survey are processed on computers to create the desired information about subsurface geologic structure.

In general, as more sensors are used, placed closer together, and/or cover a wider area, the quality of the resulting image will improve. It has become common to use thousands of sensors in a seismic survey stretching over an area measured in square kilometers. Hundreds of kilometers of cables may be laid on the ground and used to connect these sensors. Large numbers of workers, motor vehicles, and helicopters are typically used to deploy and retrieve these cables. Exploration companies would generally prefer to conduct surveys with more sensors located closer together. However, additional sensors require even more cables and further raise the cost of the survey. Economic tradeoffs between the cost of the survey and the number of sensors generally demand compromises in the quality of the survey.

In addition to the logistic costs, cables create reliability problems. Besides normal wear-and-tear from handling, they are often damaged by animals, vehicles, lightning strikes, and other problems. Considerable field time is expended troubleshooting cable problems. The extra logistics effort also adds to the environmental impact of the survey, which, among other things, adds to the cost of a survey or eliminates surveys in some environmentally sensitive areas.

As a result, wireless acquisition units have been developed to do away with the burdensome nature of cables in such a system. For instance, U.S. Pat. No. 7,773,457, which is hereby incorporated in its entirety by reference as if reproduced herein, describes a system for performing a seismic survey using wireless acquisition units.

When conducting a survey using wireless data acquisition units, it may be advantageous to perform a wireless data read out from such units in real time. As such, survey verification may occur prior to the conclusion of the survey, and the cost and time associated with manual data retrieval of such units may be reduced or eliminated. However, when employing a real time data read out, the bandwidth usage of the wireless communication between modules must be carefully considered so as not to slow the speed at which the survey is conducted.

In turn, a multiplexing regime may be imparted to the wireless modules in the seismic survey so that multiple units within range of one another may simultaneously broadcast and receive data. Examples of such multiplexing regimes include time division, frequency division, code division, etc. For example, U.S. Pat. No. 7,773,457 describes employing multiplexing techniques in a "bucket brigade" type system to perform real time read out of data.

SUMMARY

It has been recognized that a dynamic multiplexing technique, wherein the multiplexing signature used to multiplex a signal is varied at different time periods, may be provided for use in systems such as those described in U.S. Pat. No. 7,775,457. For example, when using frequency division multiplexing, regulatory bodies such as the Federal Communication Commission in the United States may enforce regulations requiring that no single frequency may be used by a module for longer than a set duration. As such, a dynamic multiplexing technique may allow for operation in such cases where static multiplexing is not feasible.

When employing such a dynamic multiplexing technique, a random or pseudo-random multiplexing regime may be employed wherein each unit uses a different random multiplexing signature during successive transmission periods. However, with multiple units using a random or pseudo-random multiplexing signature, two units may simultaneously attempt to use the same multiplexing signature to transmit data. In such instances, a data collision may occur and the units may each be required to retransmit the data which was subject to the collision. These retransmissions may reduce the bandwidth of the system, which may slow the survey. For example, in the case of two units operating within a common collision domain, it has been found that the bandwidth of the system may decrease by between 3%-5%. This may add additional time and cost to the survey, and is thus preferably avoided. As the number of units within a collision domain increases, the problem is exacerbated and the bandwidth can deteriorate much more than the amount listed above.

Accordingly, a first aspect of the present invention includes a method for use in seismic data collection. The method includes disposing, in series, a plurality of seismic data acquisition modules that are operative to wirelessly communicate acquired seismic data. The acquisition modules define a wireless serial data transfer path for relaying data from upstream acquisition modules to downstream acquisition modules and a data collection unit. The method also includes assigning a first acquisition module in the serial data transfer path a shared multiplexing sequence. In successive transmission periods, the first acquisition module advances sequentially through a plurality of multiplexing signatures of the multiplexing sequence. Also, the method includes assigning a second acquisition module in the serial data transfer path the shared multiplexing sequence. In successive transmission periods, the second acquisition module advances sequentially through the plurality of multiplexing signatures of the shared multiplexing sequence. The first acquisition module is out of phase from the second acquisition module with respect to the shared multiplexing sequence.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in one embodiment the method may also include first transmitting, using a first multiplexing signature of the plurality of multiplexing signatures, seismic data from the first acquisition module to at least one downstream acquisition module. Additionally, the method may include second transmitting, using a second multiplexing signature of the plurality of multiplexing signatures, seismic data from the second acquisition module to at least one downstream acquisition module. At least a portion of the first transmitting and at least a portion of the second transmitting may occur during a shared transmission period.

In another embodiment, the shared multiplexing sequence may comprise a plurality of pseudo-random frequencies. Additionally or alternatively, the shared multiplexing sequence may comprise a plurality of pseudo-random codes.

In yet another embodiment, the method may include assigning a third acquisition module in the serial data transfer path the multiplexing sequence. In successive transmission periods, the third acquisition module advances sequentially through the plurality of multiplexing signatures of the shared multiplexing sequence. The first acquisition module and the third acquisition module may be in phase with respect to the shared multiplexing sequence. Additionally, the first acquisition module and the third acquisition module may be at a first location and a third location, respectively. The first location and the third location may be separated by a distance greater than the transmission range of the first and third acquisition modules.

A second aspect includes a method for use in seismic data collection. The method includes disposing a plurality of wireless data modules in a seismic survey area that are operative to wirelessly communicate seismic data. Further, the method includes assigning each of the plurality of wireless data modules in the seismic survey area a shared multiplexing sequence for use in transmitting the seismic data. In successive transmission periods, each of the plurality of wireless data modules advances sequentially through a plurality of multiplexing signatures of the shared multiplexing sequence. The method also includes transmitting seismic data from at least a first wireless data module and a second wireless data module using the shared multiplexing sequence in a first shared transmission period. The method further includes detecting a collision of transmitted seismic data from the first wireless data module and the second wireless data module during the first shared transmission period. In response to the detecting, the method also includes modifying at least one of the first wireless data module or the second wireless data module out of sequence within the shared multiplexing sequence.

A number of feature refinements and additional features are applicable to the second aspect. These feature refinements and additional features may be used individually or in any combination. As such, each of the following features that will be discussed may be, but are not required to be, used with any other feature or combination of features of the second aspect.

In one embodiment, the collision comprises the first wireless data module and the second wireless data module transmitting seismic data using the same multiplexing signature during the first shared transmission period. Additionally, the modifying may result in the first wireless data module being out of phase from the second wireless data module with respect to the shared multiplexing sequence. In this regard, the modifying may comprise advancing the multiplexing signature of one of the first wireless data module or the second wireless data module and maintaining the multiplexing signature of the other of the first wireless data module or the second wireless data module. For instance, the advancing may comprise sequentially advancing through the shared multiplexing sequence. Alternatively, the advancing may comprise randomly advancing within the shared multiplexing sequence.

In one embodiment, the multiplexing signature of the first and the second wireless data module is advanced. One of the modules may be advanced out of turn. As such, each of the first and second wireless data modules may employ a different multiplexing signature than was used when the data collision occurred. In this regard, the method may further include retransmitting the transmitted seismic data which was subject to the collision from the first wireless data module and the second wireless data module using the shared multiplexing sequence in a second shared transmission period.

In another embodiment, the plurality of multiplexing signatures comprise a plurality of pseudo-random frequencies. Additionally or alternatively, the plurality of multiplexing signatures may comprise a plurality of pseudo-random codes.

A third aspect includes a system for use in seismic data acquisition. The system includes a plurality of wireless modules, disposed in series, operable to wirelessly communicate seismic data. The wireless modules define a wireless serial data transfer path for relaying seismic data from upstream modules to downstream modules and a data collection unit. Also, the system includes a first wireless module in the serial data transfer path for transmitting seismic data using a shared multiplexing sequence. In successive transmission periods the first wireless module sequences through the shared multiplexing sequence. The system further includes a second wireless module in the serial data transfer path for transmitting seismic data using the shared multiplexing sequence. In successive transmission periods the second wireless module sequences through the shared multiplexing sequence. The first wireless module is out of phase from the second wireless module with respect to the shared multiplexing sequence.

A number of feature refinements and additional features are applicable to the third aspect. These feature refinements and additional features may be used individually or in any combination. As such, each of the following features that will be discussed may be, but are not required to be, used with any other feature or combination of features of the third aspect.

For example, in one embodiment, the shared multiplexing sequence comprises a plurality of pseudo-random frequencies. Additionally, the system may include a third wireless module in the serial data transfer path for transmitting seismic data using the shared multiplexing sequence. In successive transmission periods the third wireless module sequences through the shared multiplexing sequence. The first wireless module may be in phase with the third wireless module with respect to the shared multiplexing sequence. In this regard, the first wireless module and third wireless module may be spaced apart by a distance greater than the transmission range of the first wireless module and the third wireless module.

Furthermore, a number of feature refinements and additional features are applicable to any of the foregoing aspects. These feature refinements and additional features may be used individually or in any combination. As such, each of the following features may be, but are not required to be, used with any other feature or combination of features of the foregoing aspects.

For example, the multiplexing sequence for the one or more modules described above may reside in non-volatile storage at each unit. That is, the multiplexing sequence may be stored locally in a memory of the module. Alternatively or additionally, the multiplexing sequence may be transmitted among units (e.g., from a base unit to individual units disposed in the array). In this regard, the multiplexing sequence may be updated or modified during a survey. The transmitted sequence may in turn be stored in memory once received at the module.

In addition, the modules may comprise a seismic array. The seismic array may be of any appropriate configuration. For example, the modules of any of the foregoing aspects may be arranged in lines to communicate to a base station. The modules may transmit to an adjacent module in the line or the modules may transmit to a non-adjacent module. As such, each module may communicate sequentially down the line to the base station or each module may jump adjacent modules and transmit to non-adjacent downstream modules.

DETAILED DESCRIPTION

Figure 1:
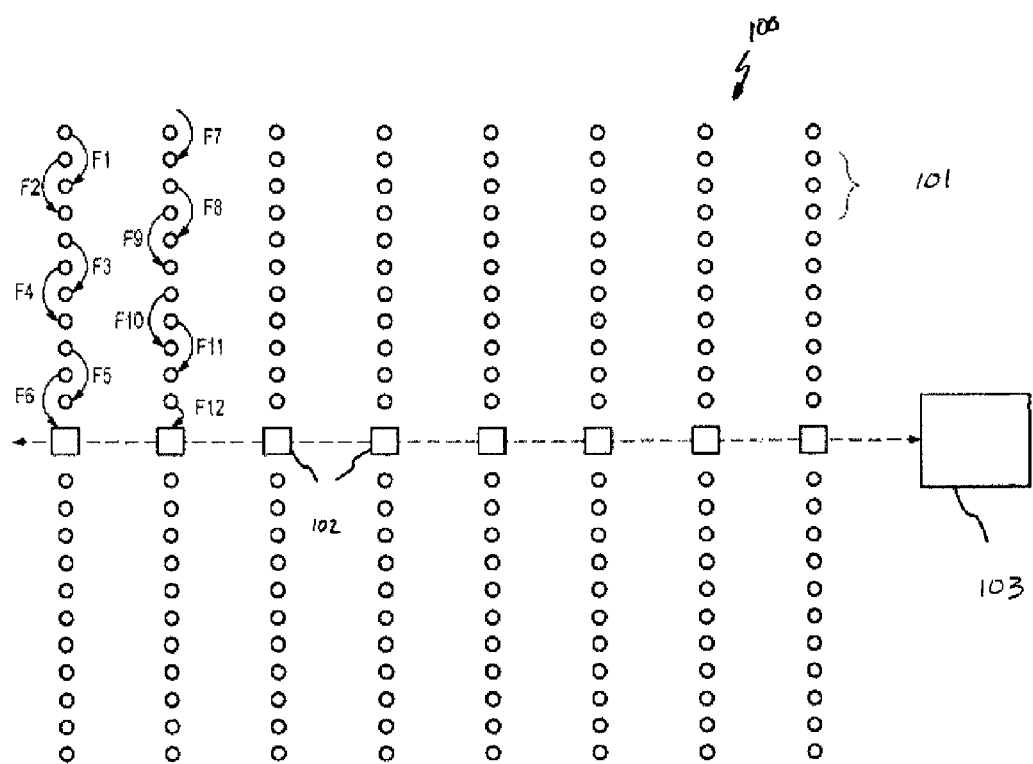
FIG. 1 is a schematic view of an embodiment of a seismic survey area.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

FIG. 1 shows one possible configuration of a seismic data acquisition system 100 in accordance with an embodiment of the present invention. The seismic acquisition system 100 may include all or any of the features described in U.S. Pat. No. 7,773,457. For example, a number of remote modules 101 may be arranged in lines as is done with previous wired systems, except that there is no physical connection between the remote modules 101. Base station modules 102 are provided which may be connected to a central control and recording system 103 by Ethernet, fiber optic, or other digital data link or a wireless substitute. Example radio links operating on frequencies F1 to F12 are indicated by arrows. Note that for improved data rate, each radio link in the illustrated embodiment leaps past the nearest remote module to the next module closer to the base station. Other radio transmission paths are possible, including direct to the nearest remote module, leaping multiple modules, or in the case of an obstruction or equipment fault, past a defective remote module or even across to another line or any other logical path that establishes a communication flow. The central control and recording system 103 may be a notebook computer or larger equivalent system.

In the various implementations of a wireless acquisition system described above, each of the wireless modules being controlled by a single base station may be referred to as a line segment. This line segment may be further divided into one or more subnets. Each subnet may comprise an independent serial data transfer path in a line segment. In this regard, and as shown in FIG. 1, a base station unit 102 may be disposed such that a portion of the line segment are arranged on opposite sides of the base station. That is, the base station may reside at a point within the line segment. The portions on either side of the base station of the line segment may be symmetric or may not be symmetric. The portions of the line segment on either side of the base station may each comprise a subnet such that each module transmits to an adjacent module rather than the embodiment depicted in FIG. 1 wherein each module transmits to a non-adjacent module nearer the base station. Furthermore, each portion of the line segment on either side of the base station may comprise multiple subnets as shown wherein modules transmit to non-adjacent modules. In this regard, modules may be interleaved such that there is more than one subset in a line segment.

Figure 9:
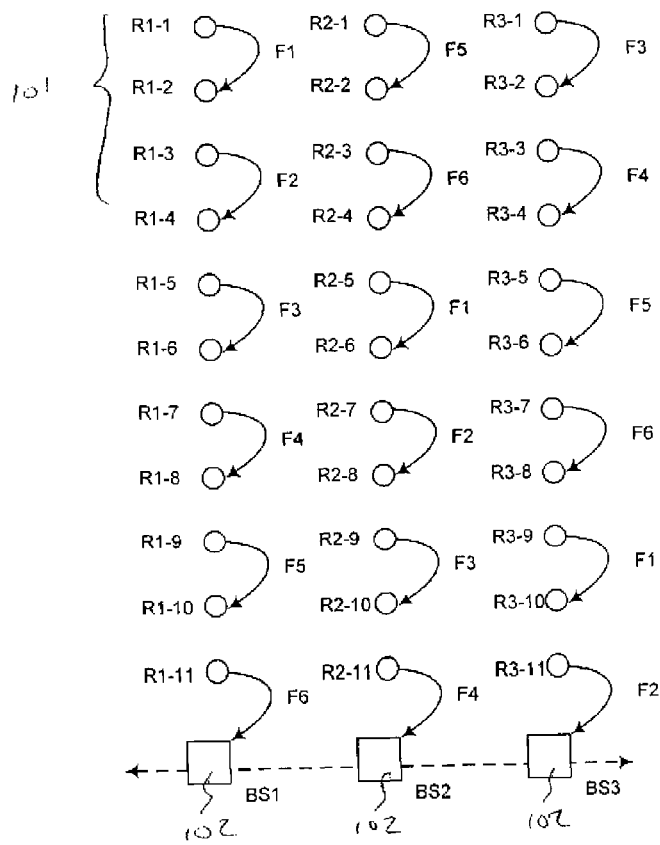
FIG. 9 is a schematic view of another embodiment of a wireless array.
Figure 10:
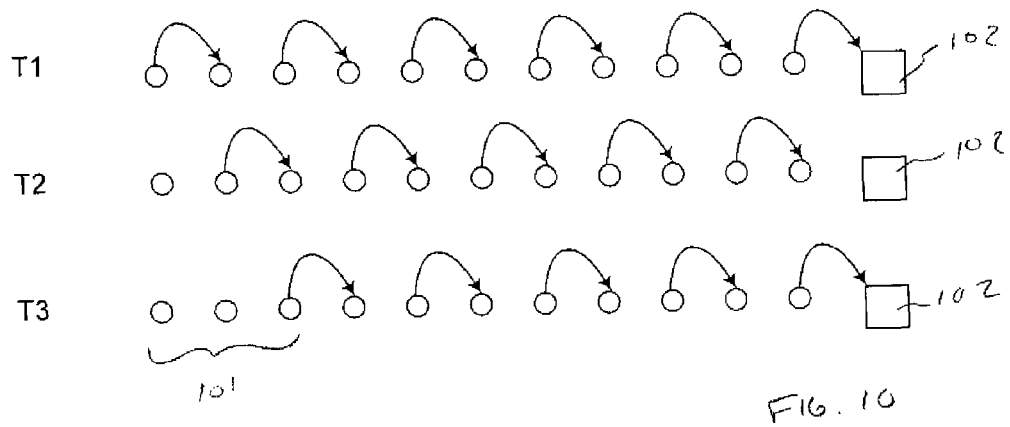
FIG. 10 is a schematic view of a portion of an embodiment of a wireless array shown in three different instances of operation.
Figure 11:
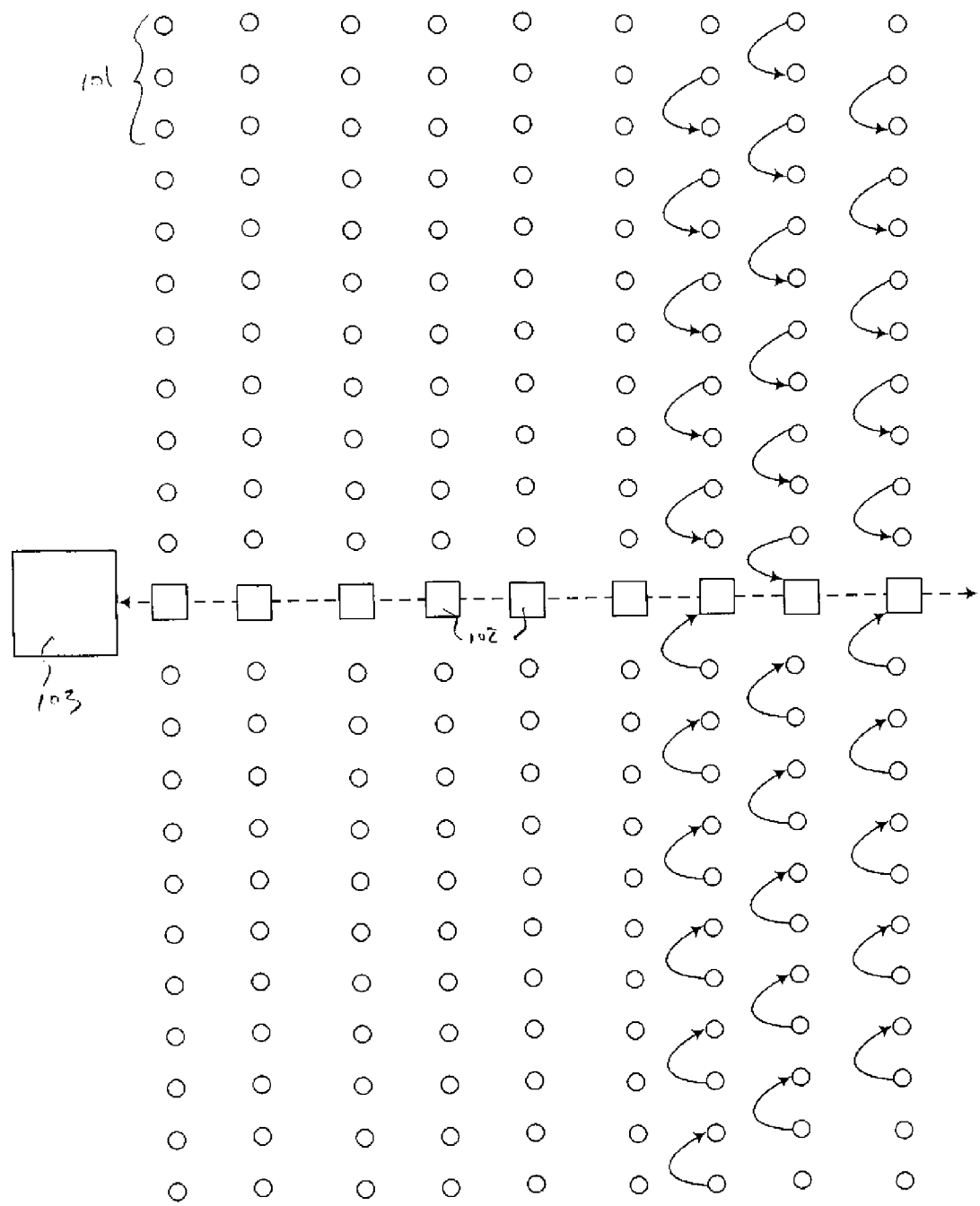
FIG. 11 is a schematic view of yet another embodiment of a wireless array.
Figure 12:
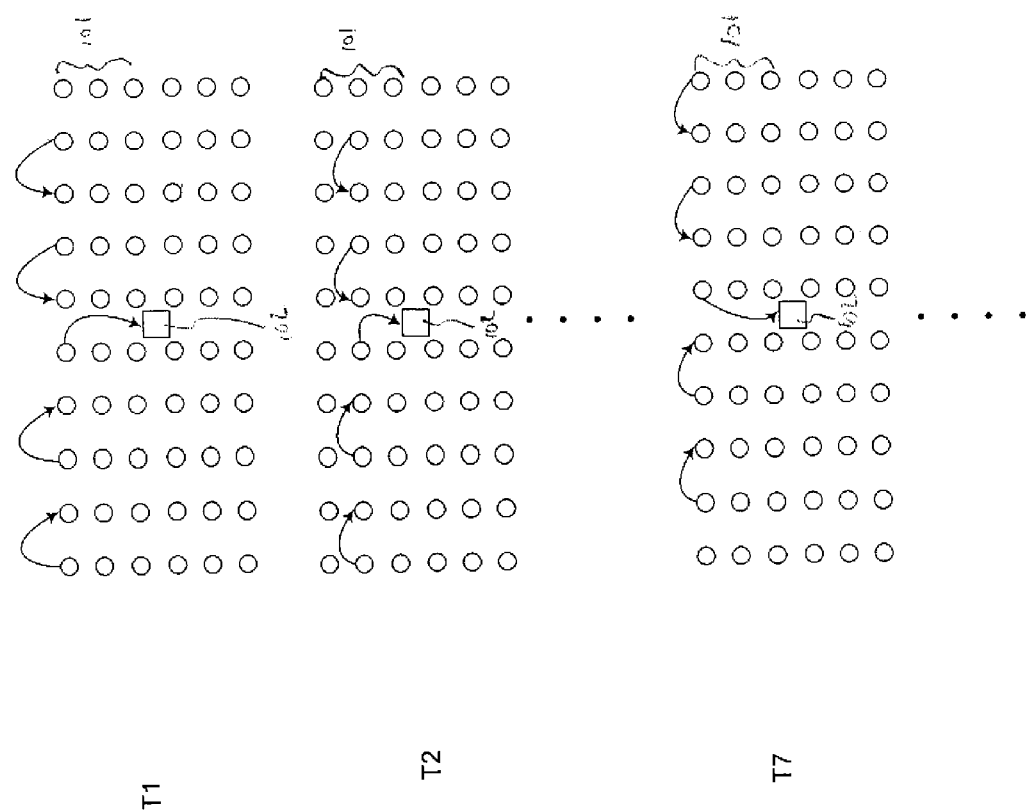
FIG. 12 is a schematic view of a wireless array shown at various instances of operation.
Figure 13:
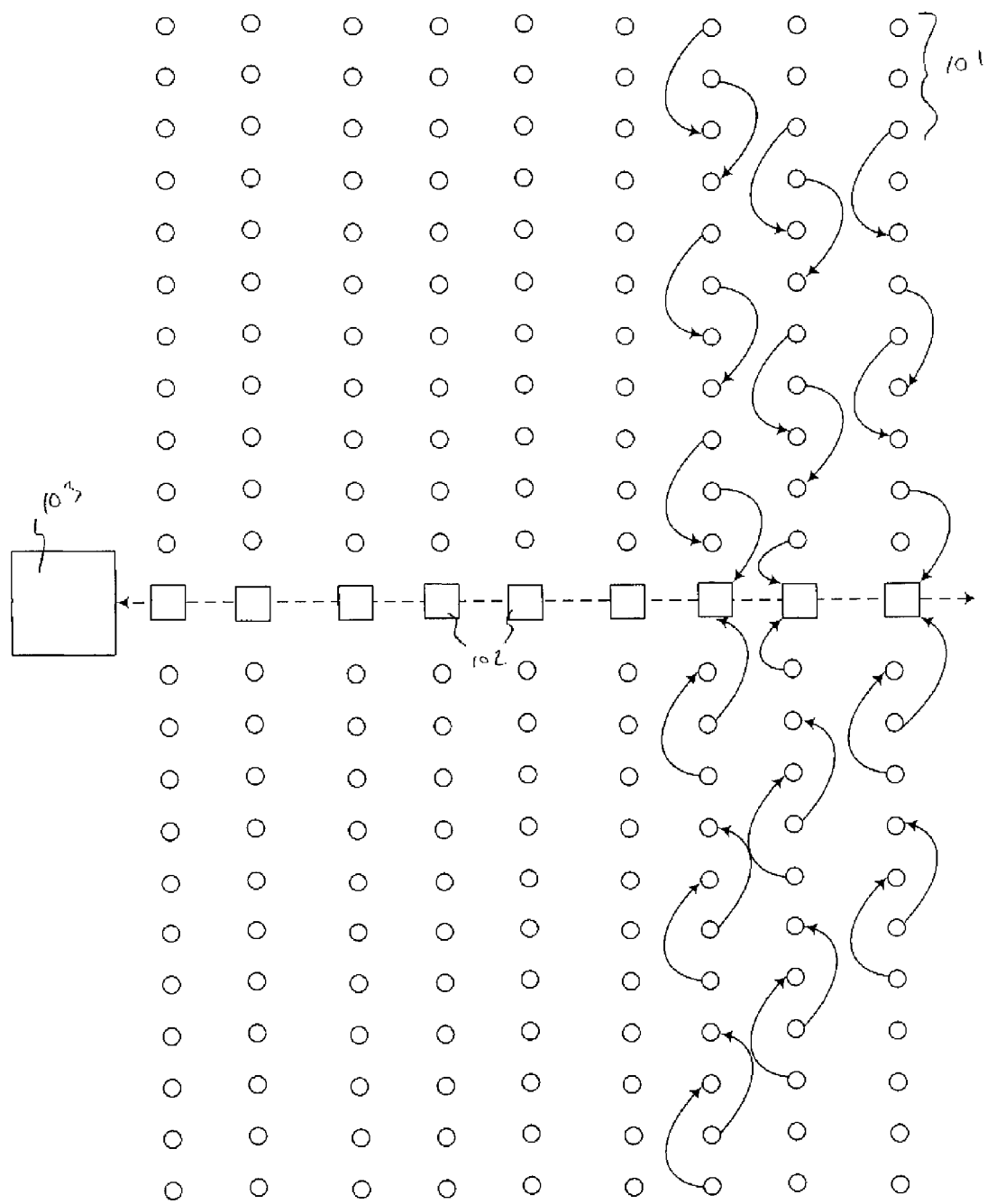
FIG. 13 is a schematic view of still another embodiment of a wireless array.

For example, with additional reference to FIG. 9, each module 101 may communicate with an adjacent module such that no modules are skipped. FIG. 10 shows a similar configuration as shown in FIG. 9, wherein each module 101 transmits to an adjacent module. FIG. 10 shows a portion of a line segment in various instances in time (T1, T2, and T3). At each successive time interval, different modules may transmit data (e.g., appending acquired seismic data to the transmission) such that the data is in turn passed down the line segment to a base station 102. A full array of this sort is shown in FIG. 11. Note that either side of a line segment may each comprise a subnet of modules. The base stations 102 may receive a transmission from a respective one of the different subnets in different transmission cycles. In this regard, and as illustrated in FIG. 12, a number of subnets may be provided that may transmit data back to a base station 102. The number of subnets may correspond on the number of cycles required for each subnet to subsequently transmit data to the base station 102. Alternatively, as shown in FIG. 13, base stations 102 may be provided with multiple radios to receive transmissions from more than one subnet at the same time. In this regard, for an embodiment wherein the base station unit interrupts the line segment and is positioned therein, the base station unit may have multiple radios operative to receive the data multiple subnets at the same time. Alternatively, the subnets may transmit to the base station in alternating time periods such that each subnet transmits data to the base station at different periods as shown in FIGS. 10-12.

In this regard, any given one of the remote modules 101 may be positioned within transmission range of one or more other remote modules. Accordingly, collision domains (e.g., areas having the potential for interference or crosstalk between modules) are introduced into the system. Each module may have a unique collision domain wherein potential interference with other modules may occur. One or more multiplexing techniques may be used to reduce the potential for collisions of transmitted seismic data in the data acquisition system. For instance, each of the remote modules 101 transmitting data may do so on one of a plurality of different frequency ranging from F1 to F12 as represented in FIG. 1. In this regard, even if all the transmissions occur during a common transmission period, use of the different frequencies allow for the simultaneous transfer of seismic data with reduced potential for data collisions. Accordingly, modules receiving data may only listen for the particular frequency such that other seismic data transferred at a different frequency is not received.

Other multiplexing techniques may also be used. For example, each of the remote modules 101 may use a different code in a code division multiplexing technique. Further still, each module 101 may transmit in a different discrete time period in a time division multiplexing technique.

In this regard, different multiplexing regimes may be applied to a wireless acquisition unit system such as the one shown in FIG. 1. As used herein, a multiplexing regime refers to the type of multiplexing used. As such, a multiplexing regime may be, but is not limited to, frequency division multiplexing, code division multiplexing, time division multiplexing or other appropriate multiplexing techniques. A multiplexing regime may employ a plurality of unique multiplexing signatures. The multiplexing signature is a unique parameter assigned to each of the remote modules. As such, in the example provided in FIG. 1, the plurality of frequencies F1-F12 each represent a unique multiplexing signature. Other multiplexing signatures may also be provided, such as different codes for use in code division multiplexing or different discrete time periods for use in time division multiplexing.

In addition to the static multiplexing technique depicted in FIG. 1 wherein each module in a collision domain employs a static multiplexing signature for transmission of data, a dynamic multiplexing regime may be employed in such a system 100. This may allow for use of the system in jurisdictions where regulatory bodies prevent the use of a single constant frequency by any particular device for longer than a set duration. As such, these units may frequency hop (i.e., change frequencies) after the unit operates at a particular frequency for a predefined duration. As such, these units may include a random or pseudo-random sequence of multiplexing signatures. The unit may randomly hop frequencies in successive transmission periods such that no single frequency is used longer than the predefined duration. This type of random frequency hopping may be employed by each of the modules in a system.

For instance, the system shown in FIG. 1 may employ such a random frequency hopping technique. As such, each of the frequencies shown F1-F12 may actually be a random or pseudo-randomly generated frequency. These random or pseudo-random frequencies may be bounded at upper and lower ends and may include a number of discrete frequencies that are defined within a range of operating frequencies. In successive transmission periods, each remote module 101 may randomly hop to another random frequency.

One such embodiment of a frequency hopping technique may be Frequency Hopping Spread Spectrum (FHSS). In an FHSS system, the initiating party sends a request via a predefined frequency or control channel to the receiving party. The receiving party may return an index number to the initiating party. The initiating party may uses the index number to determine one or more frequencies (e.g., a pseudo-random sequence of frequencies to use). In turn, the initiating party may send a synchronization signal on the first frequency in a predetermined sequence. This synchronization signal may synchronize the transmission periods of the module and serve as an acknowledgement to the receiving party that the initiating party has correctly determined the frequency sequence. In turn, data may be transmitted with both the initiating and receiving party hopping frequencies in the predefined sequence in successive transmission periods.

However, this random frequency hopping introduces a collision domain into the system because two modules may randomly employ the same multiplexing signature such that a data collision occurs. It has been estimated that the occurrence of two modules hopping to the same random frequency may reduce the bandwidth of a system by 3% to 5%. This is because once a data collision occurs, each module may hop to another random multiplexing signature in the multiplexing regime and retransmit the data, effectively losing one duty cycle for each of the colliding modules.

Accordingly, another embodiment of a dynamic multiplexing regime may include assigning a shared pseudo-random multiplexing signature sequence to each of the modules in a system. In this regard, each module in the system may be assigned an identical multiplexing signature sequence. This shared pseudo-random multiplexing signature sequence may include a sequence of frequencies, codes, or other different multiplexing signatures. This pseudo-random multiplexing sequence may be stored in memory at each of the units. For example, the multiplexing sequence may be stored in a memory module provided at the unit (e.g., a nonvolatile memory). Additionally or alternatively, this multiplexing sequence may be communicated between modules during the survey.

By using an identical multiplexing signature sequence, the potential for two modules randomly hopping to the same multiplexing signature may be reduced by controlling the phase of each module with respect to the multiplexing signature sequence. Stated differently, the modules within a collision domain may operate out of phase from each other with respect to the multiplexing signature sequence. As each of the modules may advance through the shared multiplexing signature sequence at the same rate (e.g., one multiplexing signature per transmission cycle), once modules within a given collision domain become out of phase from one another, the occurrence of data collisions may be minimized while still achieving a dynamic multiplexing environment.

Figure 2A:
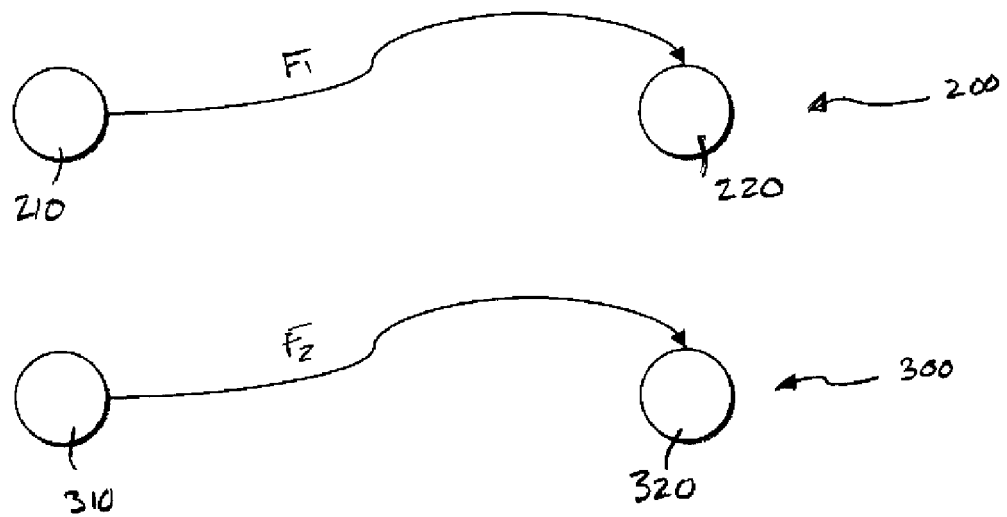
FIGS. 2A and 2B are schematic view of a first and a second wireless acquisition unit pair employing frequency division multiplexing to transmit seismic data.

This concept is further demonstrated with reference to FIG. 2A, which depicts a first seismic acquisition unit pair 200 and a second seismic acquisition unit pair 300. The first seismic acquisition unit pair 200 shares a collision domain with the second seismic acquisition unit pair 300 such that without a multiplexing technique, transmission between the first seismic acquisition unit pair 200 and the second seismic acquisition unit pair 300 may result in a data collision or crosstalk between the pairs. In this regard, the first seismic acquisition unit pair 200 may be within transmission range of the second seismic data acquisition unit pair 300. However, as shown in FIG. 2A, a first seismic acquisition unit 210 transmits to a second seismic acquisition unit 220 using a first frequency F1. At the same time, a third seismic acquisition unit 310 may transmit to a fourth seismic acquisition unit 320 using a second frequency F2. As such, crosstalk and/or data collisions are avoided and each seismic acquisition unit pair transmits data without interference using a unique multiplexing signature.

Figure 2B:
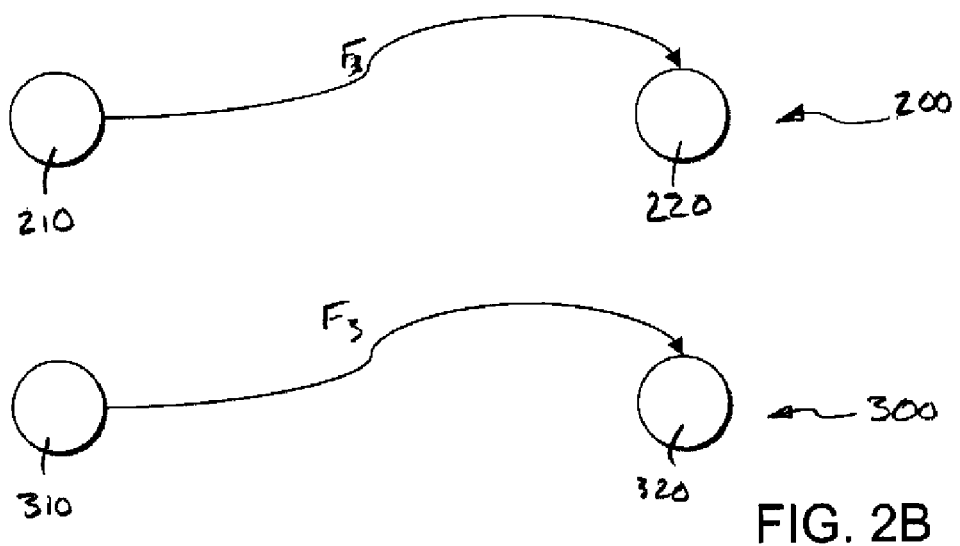

FIG. 2B depicts the same first seismic acquisition unit pair 200 and second seismic acquisition unit pair 300 shown in FIG. 2A. However, as shown in FIG. 2B, the transmission between the first seismic acquisition unit 210 and the second seismic acquisition unit 220 as well as the transmission between the third seismic acquisition unit 310 and the fourth seismic acquisition unit 320 uses a common frequency F3. The result would be a data collision such that the data transmitted between each of the unit pairs 200 and 300 may be subject to a collision. In turn, neither the second seismic acquisition unit 220 nor the fourth seismic acquisition unit 320 may accurately receive the data intended for the respective modules. This is an example of a situation where in prior systems, each unit pair would in turn randomly hop within a random sequence and retransmit the data attempted to be transmitted in FIG. 2B.

Figure 3:
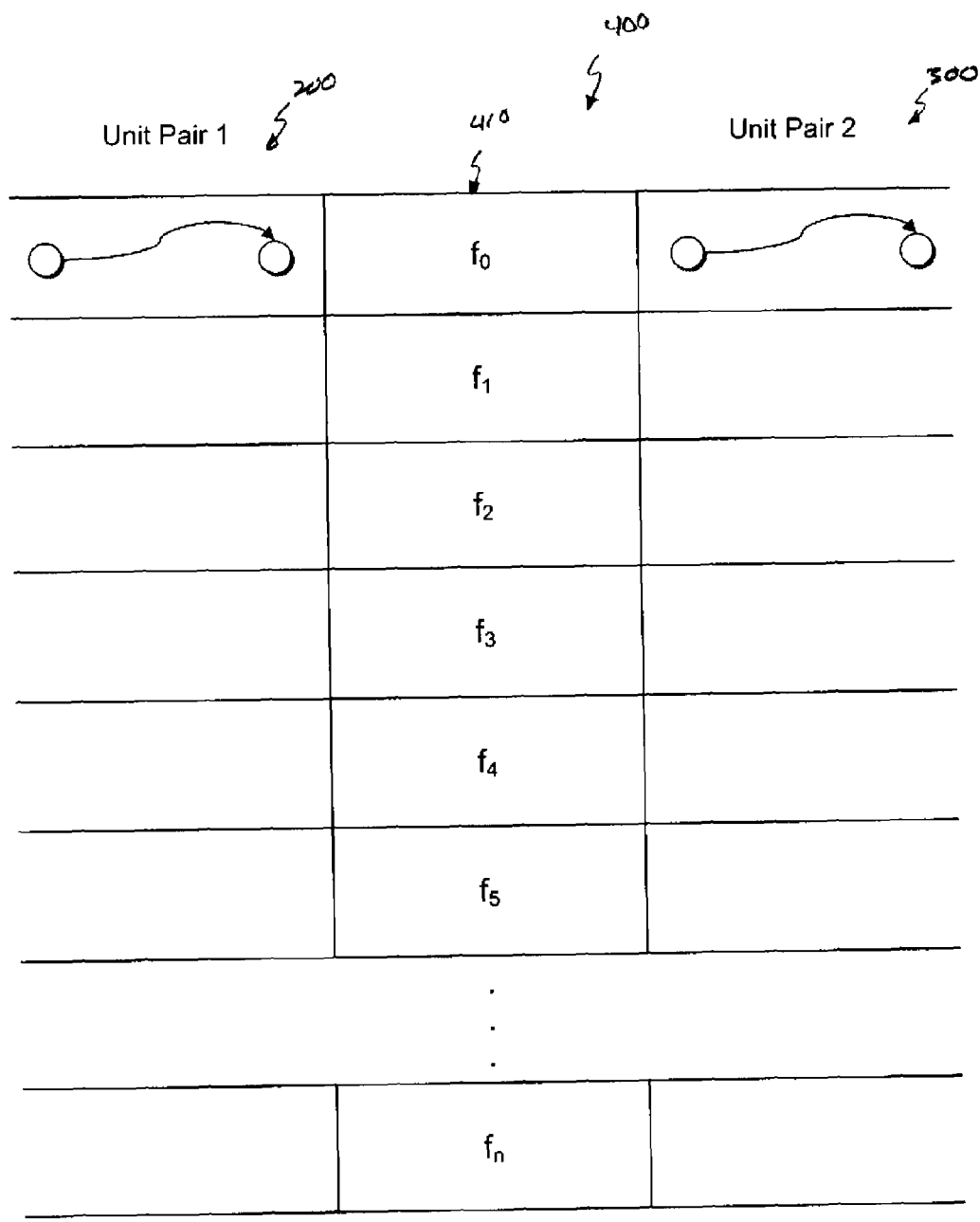
FIGS. 3-6 are charts graphically depicting the respective relative portion of a first and second acquisition unit pair at different transmission periods.

Such an instance is also depicted in FIG. 3. FIG. 3 includes a chart 400 depicting the frequency at which the first unit pair 100 and a second unit pair 200 are operating. A sequence of pseudo-random frequencies 410 are represented in the middle column of the table 400 and include frequencies $f_0$ through $f_n$. Any number of unique multiplexing signatures may be used. In addition, while $f_0$-$f_n$ are numbered consecutively, the pseudo-random frequencies may not be consecutively arranged and may jump to different (i.e., higher and lower frequencies) in the spectrum without limitation. That is, the order of $f_0$-$f_n$ does not necessarily indicate an increase or decrease in frequencies, but rather each subsequent frequency or multiplexing signature in the sequence may be random. As shown, both the first unit pair 100 and the second unit pair 200 are operating using a common frequency $f_0$. This corresponds to the situation shown in FIG. 2B where a collision may occur.

In one particular embodiment, a total of sixty-four different multiplexing signatures may be employed in order to transmit data between modules. For example, these sixty-four multiplexing signatures may comprise different frequency signatures residing in the 2.4 GHz band. Additionally, fifteen multiplexing signatures may be used that are dedicated to deployment, formation, and wake-up system functions. In this regard, these fifteen multiplexing signatures may be used in a configuration mode in order to order and establish the array.

Figure 4:
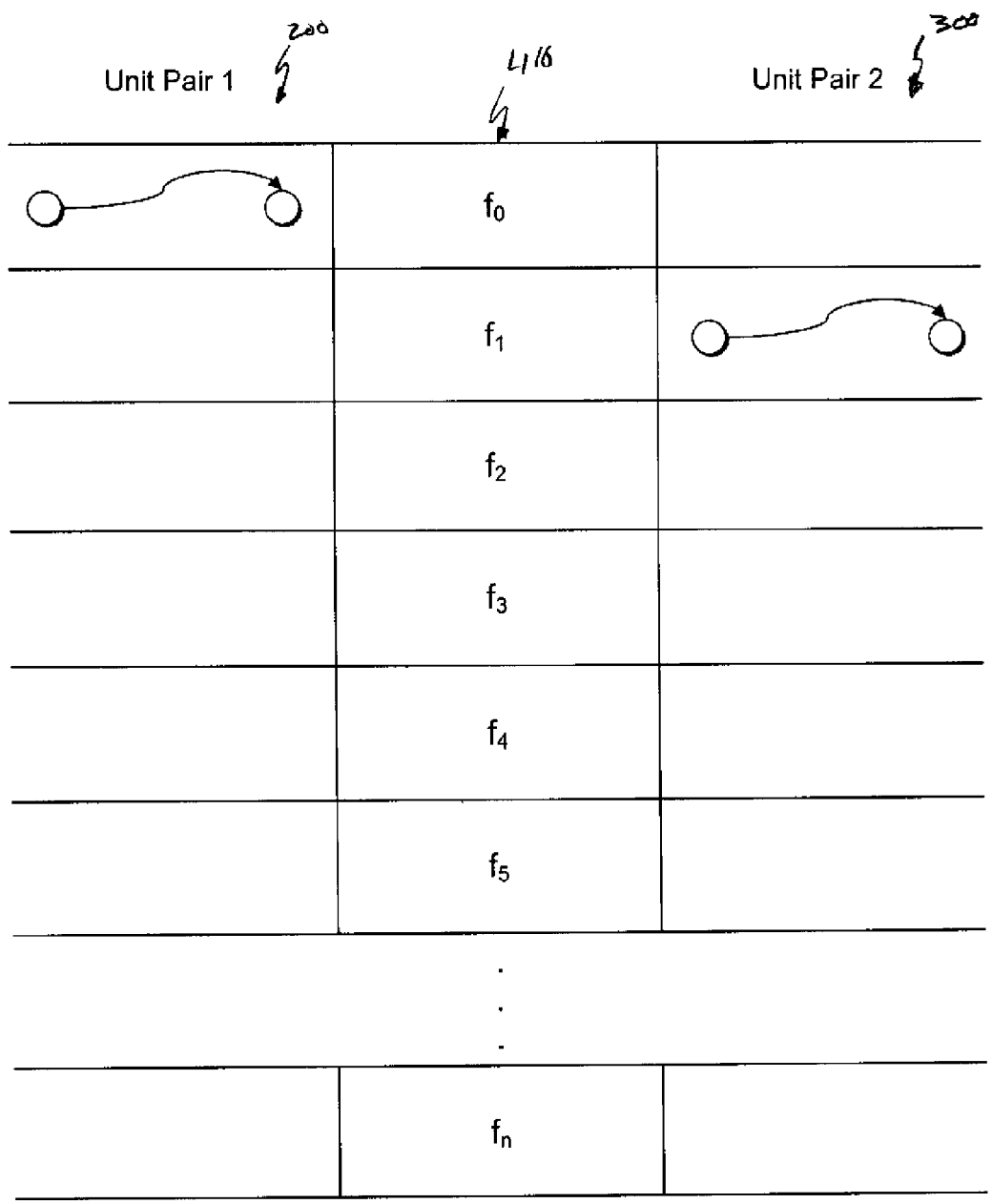

In accordance with the present invention, rather than having each of the first unit pair 100 and second unit pair 200 randomly sequence among the pseudo-random frequency signature sequence upon occurrence of a collision, the second unit pair 200 is advanced out of turn in the frequency sequence 410. The first unit pair 100 may maintain its position in the frequency sequence 400 while the second unit pair 300 is advanced. As such, the modules may operate as depicted in FIG. 4, wherein the first unit pair 200 operates at $f_n$ while the second unit pair 300 operates at $f_1$. Alternatively, the first unit pair 200 may be advanced by a single step in the sequence and the second unit pair 300 may be advanced further out of turn (e.g., by two frequencies). As such, a retransmission of data may occur such that no data collision occurs. Additionally, the first unit pair 200 is now out of phase from the second unit pair 300 with respect to the frequency sequence 410.

Figure 5:
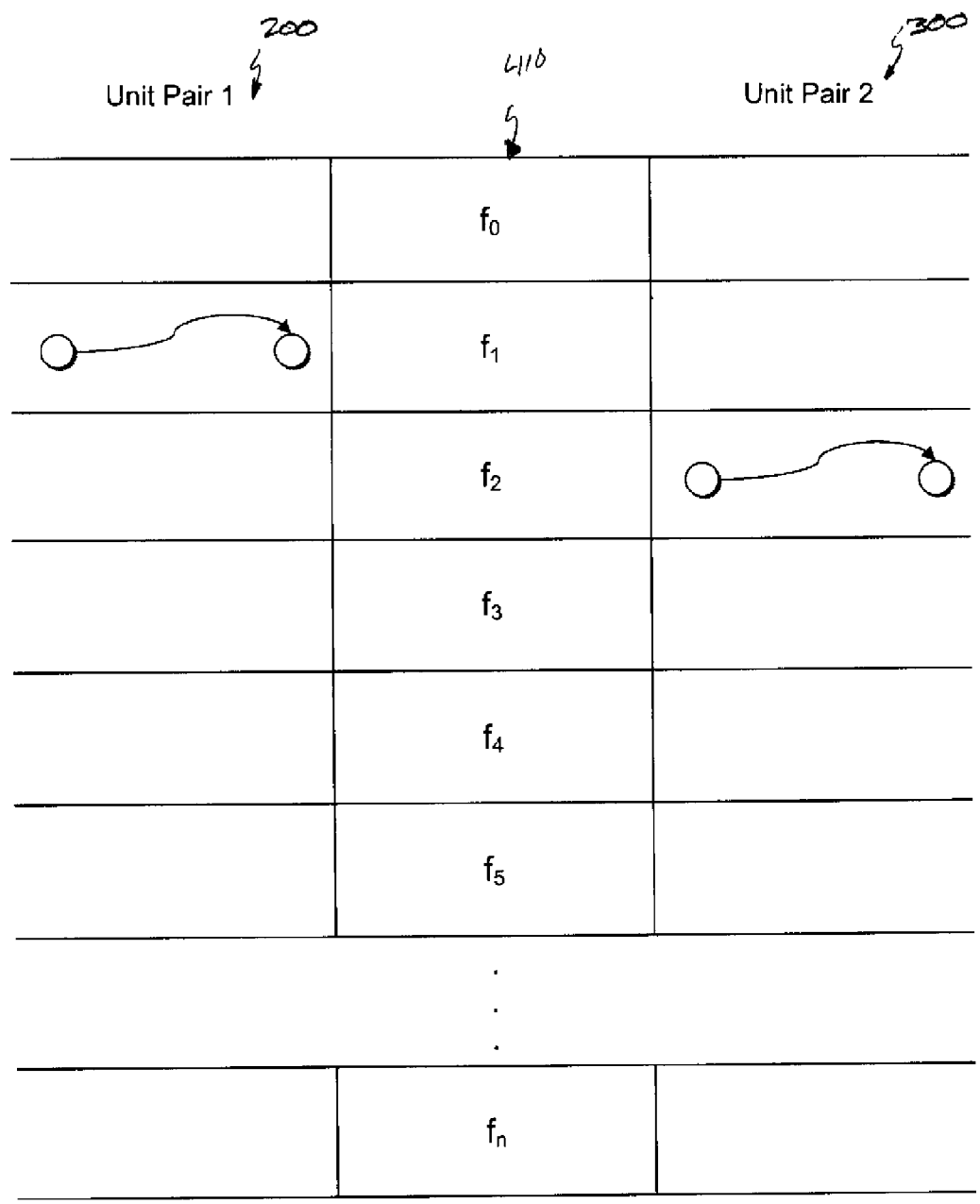
Figure 6:
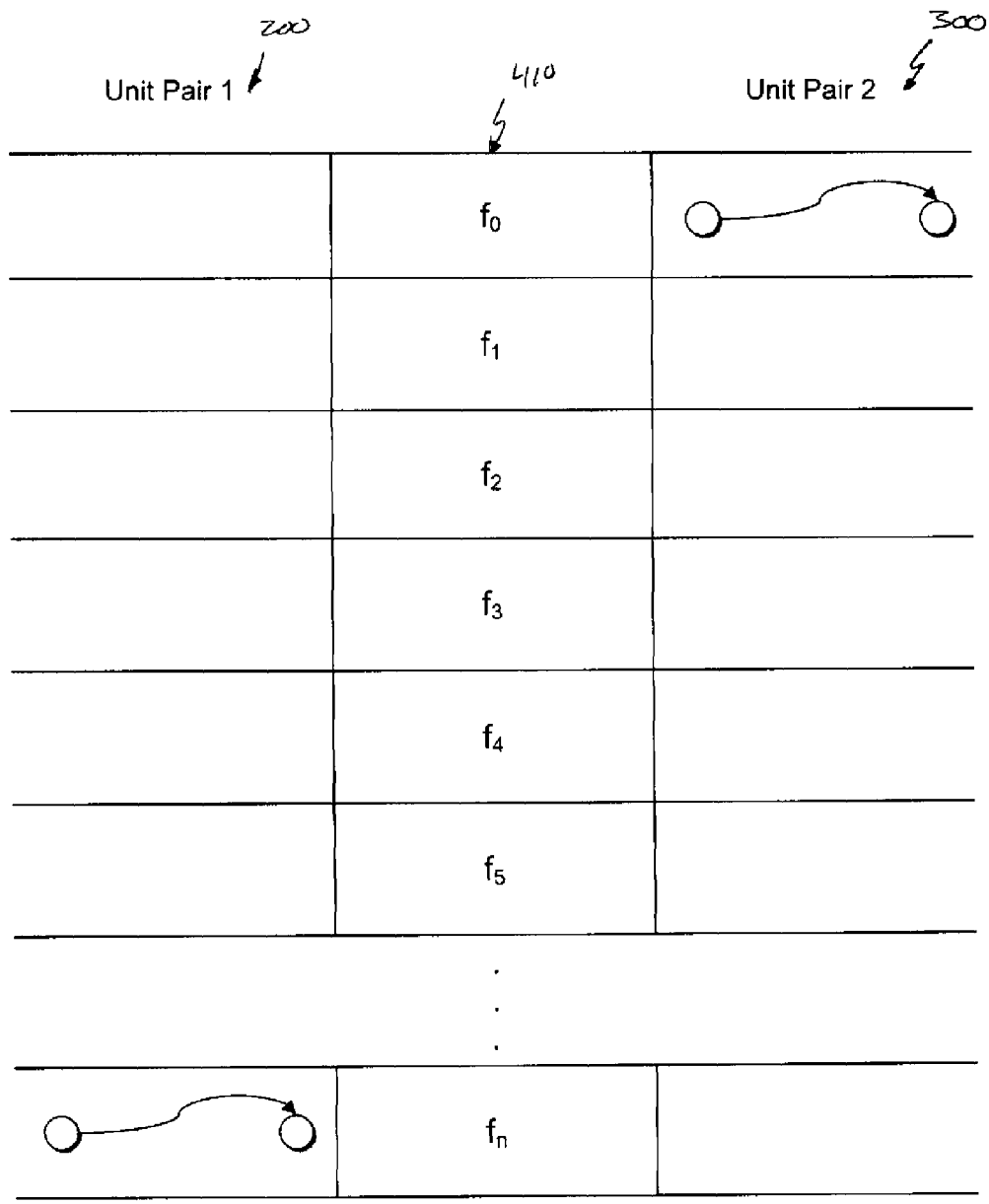

Furthermore, upon successive transmission periods, such as the one shown in FIG. 5, the first unit pair 200 and second unit pair 300 may advance at the same rate through the frequency sequence so as to stay out of phase with respect to the common frequency sequence 410 shared between the first unit pair 200 and the second unit pair 300. This may continue until the time period shown in FIG. 6 wherein the first unit pair 200 remains on the last frequency $f_n$ in the frequency sequence 410 while the second unit pair 300 recommences from the beginning of the frequency sequence 410. In turn, once one of the unit pairs is advanced out of sequence different than the other unit pair, the unit pair will remain on different multiplexing signatures in the pseudorandom sequence and thus avoid data collisions.

In this regard, rather than the ongoing potential of data collisions when using a purely random multiplexing signature hopping technique, the foregoing allows the wireless acquisition units to hop to different multiplexing signatures without the potential for data collisions so long as the units in a given collision domain remain out of phase from one another. The manner in which unit pairs are set to be out of phase from one another may vary in different embodiments. For instance, the collision domain for each individual module may be manually analyzed and respective collision domains may be determined for each acquisition unit. In turn, acquisition units identified as belonging to a common collision domain may be set such that each unit in the collision domain initiates operation out of phase with respect to each other unit in the collision domain. Based on this information, the modules are manually set to be out of phase from one another. This manual setting of the modules out of phase from one another may occur at the deployment or set up of the modules.

Alternatively, a collision detection method may be employed such that the modules begin communicating according to the sequence. Only when a collision is detected do the two colliding modules act in accordance with the foregoing such that one of the modules is advanced out of phase from the other. This out of phase advancement of one module may result in the module advancing a single point or may randomly advance through the sequence to a different point than the other colliding module. As such, a learning protocol may be employed such that the modules in the collision domain identify a collision and learn to settle into the multiplexing signature sequence such that each module in the collision domain is out of phase.

Figure 7:
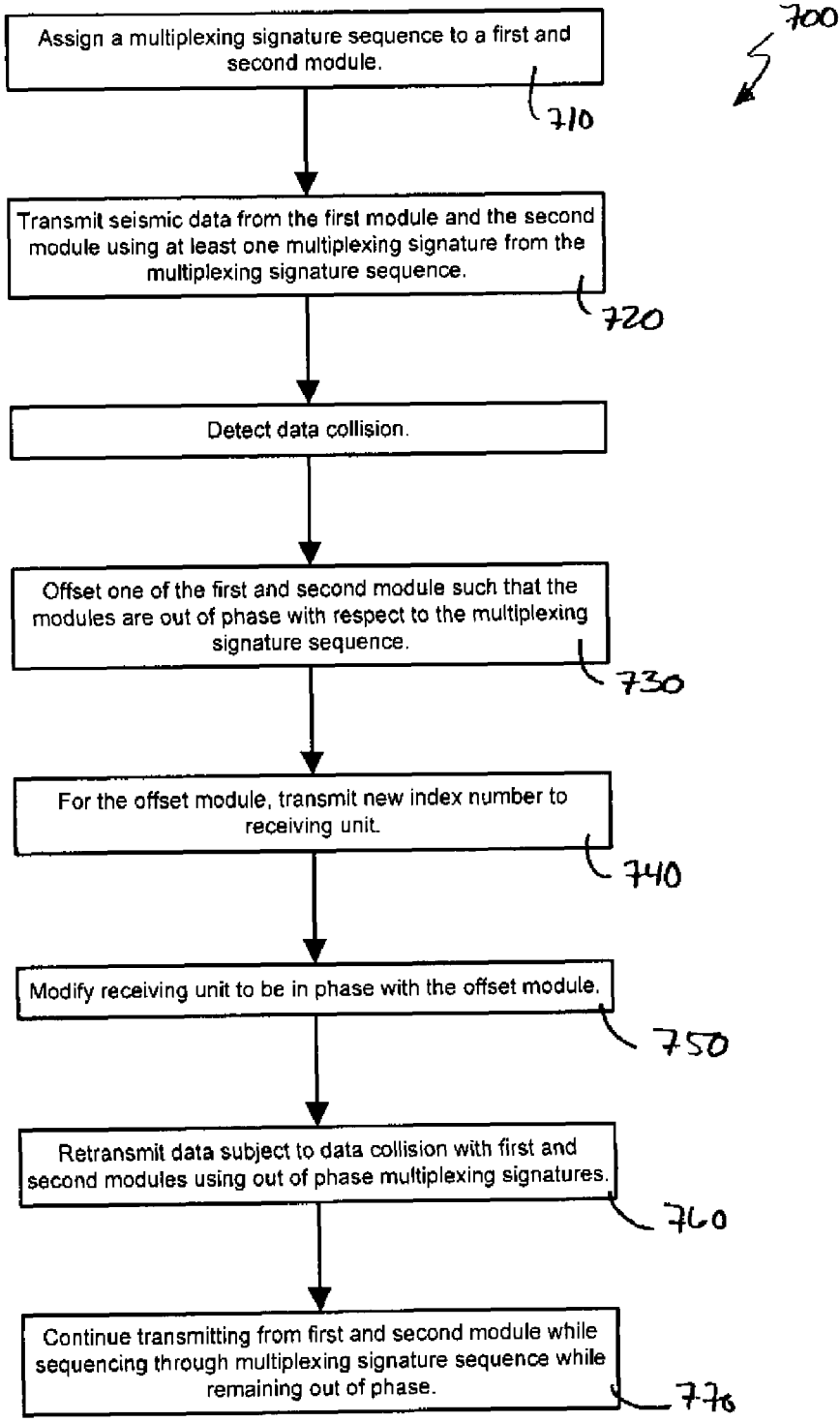
FIG. 7 is a flow chart depicting an embodiment of a process for avoiding data collisions.

One example of a process 700 for performing such a dynamic multiplexing technique is shown in FIG. 7. The process 700 may include assigning 710 a multiplexing signature sequence to a first and a second module. The process 700 may further include transmitting 720 seismic data from the first and the second module using at least one multiplexing signature at each one of the first and second module. In this regard, the first and second module may operate using a common multiplexing signature. In this regard, a collision may be detected 730. Upon detection 730 of a collision, the process 700 may include offsetting 740 one of the first or second modules such that the first and second module are out of phase from each other with respect to the multiplexing signature sequence as discussed above with regard to FIGS. 4-6.

After offsetting 740 at least one of the first and second modules within the multiplexing signature sequence, the offset module may transmit 750 and index number to a corresponding receiving unit. In this regard, the transmitting 750 of the index number to the corresponding receiving unit may allow the corresponding receiving unit to similarly advance in the multiplexing signature sequence such that the receiving unit corresponding to offset module is in sync with the offset module. In this regard, the process 700 may include modifying 716 the receiving unit to operate at the same multiplexing signature sequence as the offset module.

In this regard, the process 700 may include retransmitting 770 data subject to the data collision with the first and second modules being out of phase within the multiplexing signature sequence. The process 700 may include continuing to transmit 780 data from the first and second module when the first and second modules are out of phase with respect to the multiplexing signature sequence.

Figure 8:
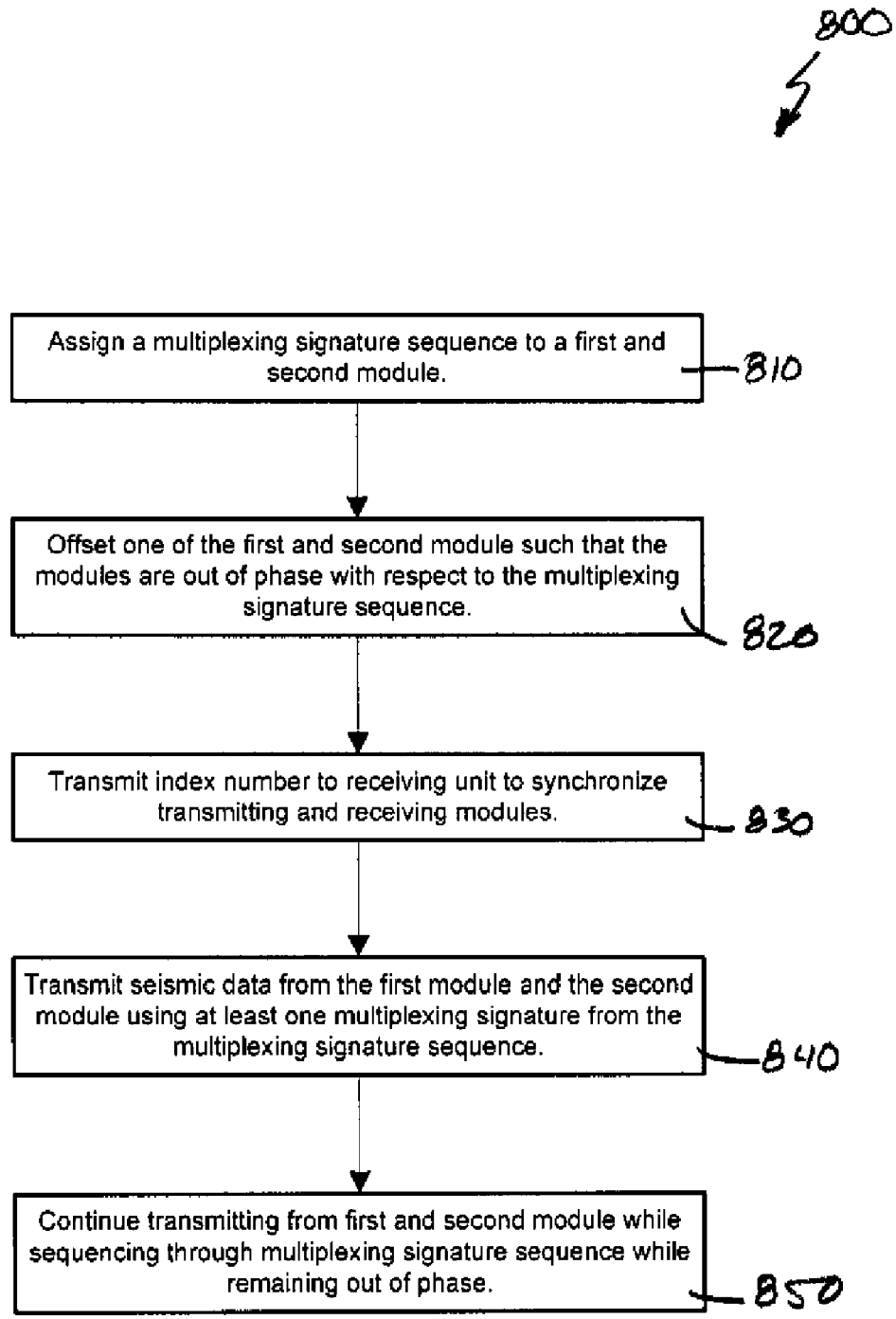
FIG. 8 is a flow chart depicting another embodiment of a process for avoiding data collisions.

An alternative embodiment of a process 800 from deploying a dynamic multiplexing technique as shown in FIG. 8. The process 800 may include manually offsetting a first and second module in an identified collision domain to be out of phase prior to the occurrence of a new transmission. In this regard, the process 800 may occur at the start up or the deployment of the units such that there is no data transmission prior to the modules being manually set to be out of phase. In this regard, the process 800 may include assigning 810 a multiplexing signature sequence to the first and second module. The process 800 may further include offsetting 820 at least one of the first and second modules within the multiplexing signature sequence such that the first and second modules are out of phase from one another with respect to the multiplexing signature sequence. Again, the offsetting 820 of the modules may be manually achieved based at least partially on identified collision domains within the array.

The process 800 may further include transmitting 830 and indexing number from a respective one of the first and second modules to corresponding receiving units. The transmitting 830 of an indexing number may allow the transmitting and receiving unit to become synchronized such that corresponding receiving units are in synch with the first and second module with respect to the multiplexing signature sequence. The method 800 may further include transmitting 840 seismic data from the first module and the second module using a multiplexing signature sequence such that the first module and the second module are out of phase with respect to the shared multiplexing signature sequence. The process 800 may continue transmitting 850 from the first and second module such that the first and second modules remain out of phase and the occurrence of data collisions is reduced.

Based on the foregoing, it will be understood that for a given number of modules in a collision domain, there may be at least a corresponding number of unique multiplexing signatures such that each of the modules may in turn occupy a point in the sequence out of phase from the other modules. Based on this, the design of the survey may be modified such that on appropriate number of multiplexing signatures may be made available based on the number of modules in a given collision domain.

While described herein as using frequencies, the same principle may also be applied wherein the multiplexing signature sequence includes different codes applied to the data and transmitted using code division multiplexing. In this regard, the sequence may be pseudorandom may include a random code generator.

In addition, the wireless modules described herein may be location aware. In this regard, and as described in U.S. Pat. No. 7,773,457, the modules may have components that are operative to obtain location data for the module. A module which has obtained location data may transmit its location data to another module in the array which has yet to locate itself. In this regard, the location data transmitted from the location aware module to the locating module may be used by the locating module to acquire a location. For instance, when a GPS module is provided to obtain location data, ephemeris data of a wireless module which is used to acquire a GPS location may be provided to another module which is yet to acquire a location data from a satellite. In this regard, the ephemeris data may be used by the locating wireless module to obtain location data. This may improve the locating modules ability to require satellite location data. For instance, the time required to acquire a satellite fix may be reduced such that the modules may be deployed and located faster.

Additionally, while the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for use in seismic data collection, comprising:
disposing in an array a plurality of seismic data acquisition modules that are operative to wirelessly communicate acquired seismic data;
assigning a first acquisition module a shared multiplexing sequence, wherein in successive transmission periods, said first acquisition module advances sequentially through a plurality of multiplexing signatures of said multiplexing sequence; and
assigning a second acquisition module said shared multiplexing sequence, wherein in successive transmission periods, said second acquisition module advances sequentially through said plurality of multiplexing signatures of said shared multiplexing sequence;
wherein said first acquisition module is out of phase from said second acquisition module with respect to said shared multiplexing sequence.

2. The method according to claim 1, wherein at least a portion of the plurality of seismic data acquisition modules are disposed in series, wherein said portion of said plurality of seismic acquisition modules define a wireless serial data transfer path for relaying data from upstream acquisition modules to downstream acquisition modules and a data collection unit in said serial data transfer path, and wherein said first acquisition module and said second acquisition module belong to said wireless serial data transfer path.

3. The method according to claim 2, further comprising:
first transmitting, using a first multiplexing signature of said plurality of multiplexing signatures, seismic data from said first acquisition module to at least one downstream acquisition module; and
second transmitting, using a second multiplexing signature of said plurality of multiplexing signatures, seismic data from said second acquisition module to at least one downstream acquisition module.

4. The method according to claim 3, wherein at least a portion of said first transmitting and at least a portion of said second transmitting occur during a shared transmission period.

5. The method according to claim 4, wherein said shared multiplexing sequence comprises a plurality of pseudo-random frequencies.

6. The method according to claim 1, wherein said shared multiplexing sequence comprises a plurality of pseudo-random codes.

7. The method according to claim 1, further comprising:
assigning a third acquisition module in said serial data transfer path said shared multiplexing sequence, wherein in successive transmission periods, said third acquisition module advances sequentially through said plurality of multiplexing signatures of said shared multiplexing sequence;
wherein said first acquisition module and said third acquisition module are in phase with respect to said shared multiplexing sequence.

8. The method according to claim 7, wherein said first acquisition module and said third acquisition module are at a first location and a third location, respectively, and wherein said first location and said third location are separated by a distance greater than a transmission range of said first and third acquisition modules.

9. A method for use in seismic data collection, comprising:
disposing a plurality of wireless data modules in a seismic survey area that are operative to wirelessly communicate seismic data;
assigning each of said plurality of wireless data modules in said seismic survey area a shared multiplexing sequence for use in transmitting said seismic data, wherein in successive transmission periods, each of said plurality of wireless data modules advances sequentially through a plurality of multiplexing signatures of said shared multiplexing sequence;
transmitting seismic data from at least a first wireless data module and a second wireless data module using said shared multiplexing sequence in a first shared transmission period;
detecting a collision of transmitted seismic data from said first wireless data module and said second wireless data module during said first shared transmission period; and
modifying, in response to said detecting, a relative position of said first wireless data module and said second wireless data module within said shared multiplexing sequence such that the first and second wireless data modules are out of sequence with respect to said shared multiplexing sequence.

10. The method according to claim 9, wherein said collision comprises said first wireless data module and said second wireless data module transmitting seismic data using a same multiplexing signature during said first shared transmission period.

11. The method according to claim 9, wherein said modifying results in said first wireless data module being out of phase from said second wireless data module with respect to said shared multiplexing sequence.

12. The method according to claim 9, wherein said modifying comprises advancing said multiplexing signature of one of said first wireless data module or said second wireless data module and maintaining said multiplexing signature of said other of said first wireless data module or said second wireless data module.

13. The method according to claim 12, wherein said advancing comprises sequentially advancing through said shared multiplexing sequence.

14. The method according to claim 12, wherein said advancing comprises randomly advancing within said shared multiplexing sequence.

15. The method according to claim 11, wherein said multiplexing signature of said first and said second wireless data module is advanced.

16. The method according to claim 11, further comprising:
retransmitting said transmitted seismic data which was subject to said collision from said first wireless data module and said second wireless data module using said shared multiplexing sequence in a second shared transmission period.

17. The method according to claim 9, wherein said plurality of multiplexing signatures comprise a plurality of pseudo-random frequencies.

18. The method according to claim 9, wherein said plurality of multiplexing signatures comprise a plurality of pseudo-random codes.

* * * * *